US011958029B2

(12) United States Patent
Ottelin

(10) Patent No.: US 11,958,029 B2
(45) Date of Patent: Apr. 16, 2024

(54) AGITATOR ASSEMBLY

(71) Applicant: Sulzer Management AG, Winterthur (CH)

(72) Inventor: Juha Ottelin, Turku (FI)

(73) Assignee: SULZER MANAGEMENT AG, Winterthur (CH)

( * ) Notice: Subject to any disclaimer, the term of this patent is extended or adjusted under 35 U.S.C. 154(b) by 529 days.

(21) Appl. No.: 17/266,722

(22) PCT Filed: Aug. 6, 2019

(86) PCT No.: PCT/EP2019/071088
§ 371 (c)(1),
(2) Date: Feb. 8, 2021

(87) PCT Pub. No.: WO2020/035350
PCT Pub. Date: Feb. 20, 2020

(65) Prior Publication Data
US 2021/0299623 A1 Sep. 30, 2021

(30) Foreign Application Priority Data
Aug. 15, 2018 (EP) .................... 18189166

(51) Int. Cl.
*B01F 13/04* (2006.01)
*B01F 15/00* (2006.01)
(Continued)

(52) U.S. Cl.
CPC ............. *B01F 35/60* (2022.01); *B01F 33/86* (2022.01); *B01F 35/40* (2022.01); *B01F 2035/351* (2022.01)

(58) Field of Classification Search
CPC .... B01F 2035/351; B01F 35/40; B01F 35/60; F16J 15/008
See application file for complete search history.

(56) References Cited

U.S. PATENT DOCUMENTS 3,986,707 A  10/1976 Frost
4,106,778 A   8/1978 Cormack et al.
(Continued)

FOREIGN PATENT DOCUMENTS

CN  103877888 A   6/2014
CN  104107649 A  10/2014
(Continued)

OTHER PUBLICATIONS

International Search Report and Written Opinion dated Oct. 30, 2019 in International Patent Application No. PCT/EP2019/071088, filed Aug. 6, 2019.

*Primary Examiner* — Elizabeth Insler
(74) *Attorney, Agent, or Firm* — GLOBAL IP COUNSELORS, LLP

(57) ABSTRACT

An agitator assembly includes an agitator body, a shaft and a blocking part. The shaft is assembled to the agitator body and extends through a lead-through in the agitator body into the vessel, when assembled for use, and includes a sealing to seal the rotatable shaft. The blocking part arranged at the agitator body and including a shaft opening through which the shaft is arranged to extend, a mating surface to mate with the shaft which, when brought together by axial movement of the blocking part, provides a seal between the blocking part and the shaft, and the mating surface arranged at an axial distance from the sealing in the lead-through, and when brought together by the axial movement of the blocking part, provides a seal between the blocking part and the agitator body, and that the blocking part provides a closed space around the lead-through in the agitator body.

11 Claims, 6 Drawing Sheets

(51) Int. Cl.
*B01F 33/00* (2022.01)
*B01F 35/40* (2022.01)
*B01F 35/60* (2022.01)
B01F 35/30 (2022.01)

(56) References Cited

U.S. PATENT DOCUMENTS

| | | | | |
|---|---|---|---|---|
| 4,556,222 | A | | 12/1985 | Lewis et al. |
| 4,878,677 | A | * | 11/1989 | Larkins .................. F16J 15/183 |
| | | | | 366/331 |
| 7,237,778 | B1 | | 7/2007 | Althouse |
| 2002/0121745 | A1 | * | 9/2002 | Vogel ..................... F16J 15/189 |
| | | | | 277/510 |

FOREIGN PATENT DOCUMENTS

| | | | |
|---|---|---|---|
| CN | 106040370 | A | 10/2016 |
| CN | 206199124 | A | 5/2017 |
| CN | 108211867 | A | 6/2018 |
| GB | 852224 | A | 10/1960 |

\* cited by examiner

AGITATOR ASSEMBLY

CROSS-REFERENCE TO RELATED APPLICATIONS

This application is a U.S. National Stage application of International Application No. PCT/EP2019/071088, filed Aug. 6, 2019, which claims priority to European Patent Application No. 18189166.4, filed Aug. 15, 2018, the contents of each of which are hereby incorporated herein by reference.

BACKGROUND

Field of the Invention

The present invention relates to an apparatus for agitate fluids, and particularly to agitator assembly.

Background Information

Conventional agitators are generally used in the wood-processing industry or other chemical industries for mixing various fluids with each other and for mixing solid materials with fluids. These devices are constructed with the object of achieving the greatest possible mixing efficiency with the lowest possible power consumption, as well as achieving high reliability of operation.

In general, conventional agitators are inserted into a mixing vessel, or a vessel, from the side thereof, through a wall of the vessel. The agitator has a body by which it is attached to an opening in a wall of the vessel. There is a drive shaft in the agitator to which a propeller or a like is attached. The propeller is naturally inside the vessel. The shaft is driven at the opposite end to the propeller typically by an electric motor via a transmission. The shaft of the agitator is rotationally supported by suitable bearings and it is also sealed to the body such that leaking of the fluid along the surface of the shaft from the vessel is prevented or at least minimized. Should the shaft sealing fail, the fluid in the vessel will leak to the surroundings until the sealing is prepared. Typically the volume of the vessel and the amount of the fluid in the vessel is so such that when a major failure of the sealing occurs, the amount of fluid spread into the surroundings is unacceptably large. Therefore there is a need to provide a temporary sealing to block the leak until the shaft sealing is replaced to new one or properly fixed.

U.S. Pat. No. 4,106,778 relates to devices for temporarily sealing and supporting shafts and suggests providing a shaft with two conical collars in the shaft and respectively two wedging ring members slideable supported within the housing for sealing the shaft temporarily during a service of actual sealing of the shaft.

U.S. Pat. No. 7,237,778 shows a shut-off seal assembly for use with the drive assembly of fluid-containing vessels. The assembly comprises a sleeve in the shaft having a cone shaped end which can be driven against a corresponding cone shaped part in the body around the shaft.

U.S. Pat. No. 4,556,222 shows a solution for temporarily sealing a rotatable shaft in which an additional seal ring inside a vessel can be axially moved by pull bars against the actual sealing housing providing a temporary seal for used during service of the actual seal.

All these suggested solutions are somewhat complex.

Document US 2002/121745 A1 discloses an agitator assembly in which a drive shaft lead-through can be temporarily sealed with an auxiliary sealing device for sealing the leadthrough so as to replacing packing material in a shaft seal.

Document GB 852 224 A discloses a propeller type mixing machine in which a shaft seal includes sealing by which the shaft lead-through can be temporarily sealed.

SUMMARY

An object of the invention is to provide an agitator assembly which is more simple and reliable compared to the prior art solutions.

Objects of the invention can be met substantially as is disclosed herein and in detail with the different embodiments of the invention.

According to an embodiment of the invention an agitator assembly comprises an agitator body configured to be attached to a wall of a vessel or a tank, and a shaft having an axial direction, the shaft being rotatably assembled to the agitator body and extending through a lead-through in the agitator body into the vessel or the tank, when assembled for use, and further a sealing configured to seal the rotatable shaft. The agitator assembly further comprises a blocking part arranged to the agitator body provided with a shaft opening through which the shaft is arranged to extend, that the blocking part is movable in axial direction, and the blocking part is provided with mating surfaces with the shaft and the agitator body which, when brought together by the axial movement of the blocking part, provide a temporary seal between the blocking part and the shaft, and the blocking part provides a closed space around the lead-through.

The temporary seal prevents, or at least minimizes the leakage of the fluid until the actual shaft seal is replaced or prepared.

According to an embodiment of the invention the shaft is arranged to extend through the lead-through from a first side to a second side of the lead-through, which second side is inside the vessel when assembled for use, and the blocking part is arranged at a second side of the agitator body such that the blocking part provides a closed space to the second side of the agitator body around the lead-through.

According to an embodiment of the invention the shaft is arranged to extend through the lead-through from a first side to a second side of the lead-through, which first side is outside the vessel when assembled for use, and the blocking part is arranged at a first side of the agitator body such that the blocking part provides a closed and liquid-tight space to the first side of the agitator body around the lead-through.

According to an embodiment of the invention the agitator assembly comprises a force transmission means or device configured to move the blocking part axially.

According to an embodiment of the invention the mating surface of the shaft is formed directly to the material of the shaft.

According to an embodiment of the invention the force transmission is device arranged operable in the first side of the agitator body and coupled with the blocking part so as to move the blocking part axially by operating the force transmission device from the first side of the agitator body.

According to an embodiment of the invention the force transmission device comprises a number of pull bars and a number of push bars extending through the agitator body parallel with the shaft from the first side to the second side wherein the bars are configured to move the blocking part in the axial direction.

According to an embodiment of the invention the pushing and pull bars are arranged one after the other around the shaft so that every other bar is a push bar and every other bar is a pull bar.

According to an embodiment of the invention the blocking part comprises a cylindrical section parallel with the shaft and an end wall at its end opposite to the agitator body of the agitator assembly into which end wall the shaft opening is arranged, and the agitator body includes a circular, axially extending recess, into which the blocking part is arranged in a movable manner.

According to an embodiment of the invention the mating surfaces in the blocking part and the shaft comprise conical surfaces having supplementary angles.

According to an embodiment of the invention the assembly comprises a conduit, a first end of which opens into the space.

According to an embodiment of the invention the mating surface of the shaft is formed by a separate annular seal part assembled around shaft.

The exemplary embodiments of the invention presented in this patent application are not to be interpreted to pose limitations to the applicability of the appended claims. The verb "to comprise" is used in this patent application as an open limitation that does not exclude the existence of also unrecited features. The features recited herein are mutually freely combinable unless otherwise explicitly stated. The novel features which are considered as characteristic of the invention are set forth herein.

BRIEF DESCRIPTION OF DRAWINGS

The invention will be explained in more detail hereinafter with reference to the drawings.

DETAILED DESCRIPTION

Figure 1:
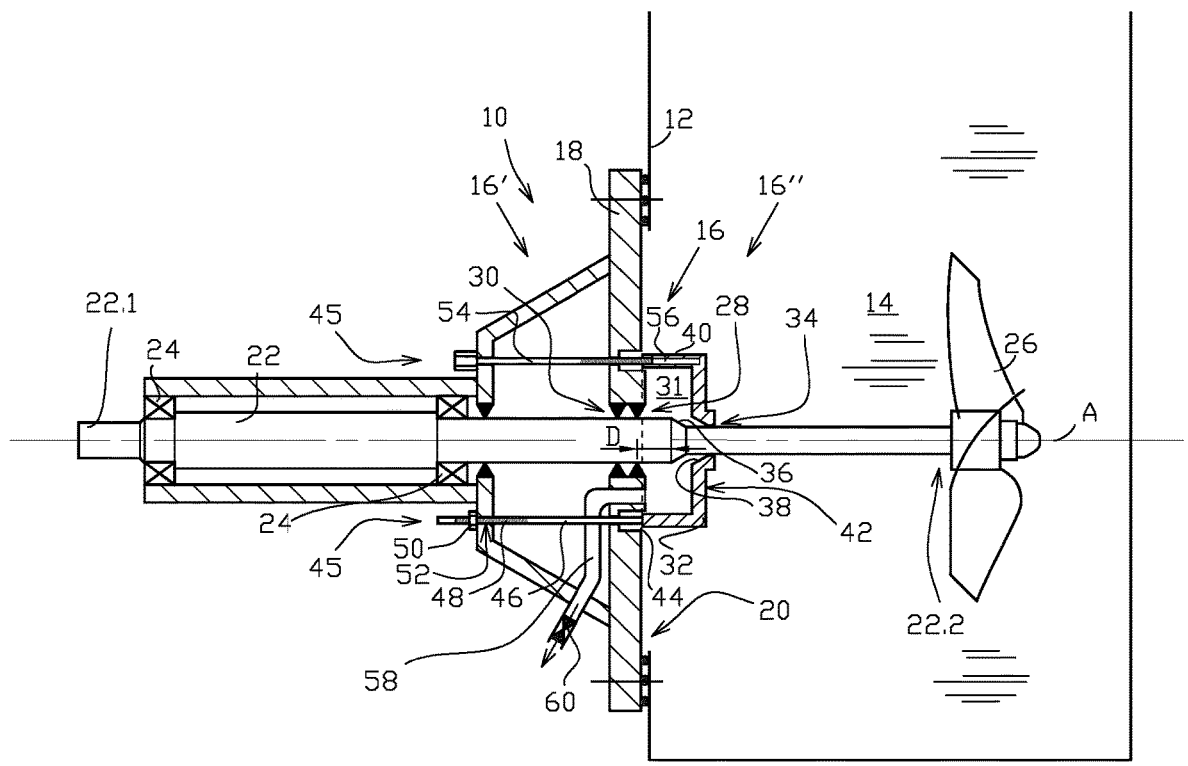
FIG. 1 illustrates an agitator assembly according to an embodiment of the invention.

FIG. 1 schematically depicts an agitator assembly 10 (referred to simply also as an assembly) arranged at a wall 12 of a vessel or a tank 14 in which any desired fluid can be stored and/or processed. The agitator comprises an agitator body 16 by which it is attached to an opening 20 in the wall 12 of the tank 14. The agitator body 16 includes a flange part 18 to serve that purpose. There is a shaft 22 arranged to the agitator assembly 10 which has a rotational axis A also defining its axial direction. The assembly 10 comprises bearings 24 by which the shaft 22 is supported on and assembled to the agitator body 16. The shaft 22 is configured to be connected to a motor or a force transmission system at its first end 22.1 and, when assembled to the vessel 14 for use to agitate the liquid in the vessel, the agitator assembly 10 includes a propeller 26 at the second end 22.2 of the shaft 22. The agitator body 16 comprises an opening, or a lead through 28. The shaft 22 is arranged to extend through the lead-through 28 from a first side 16' to a second side 16" of the lead-through 28, which the first side is outside the vessel or tank 14 and the second side is inside the vessel or the tank 14 when assembled for use. The assembly 10 also includes a sealing (seal) 30 in the lead-through 28 configured to seal the rotatable shaft 22 between the first side 16' and the second side 16". The sealing can comprise a number of axially arranged successive lip seals, or a like suitable sealing. The bearings 24 of the shaft are arranged axially in the first side 16' of the lead-through 28.

Figure 2:
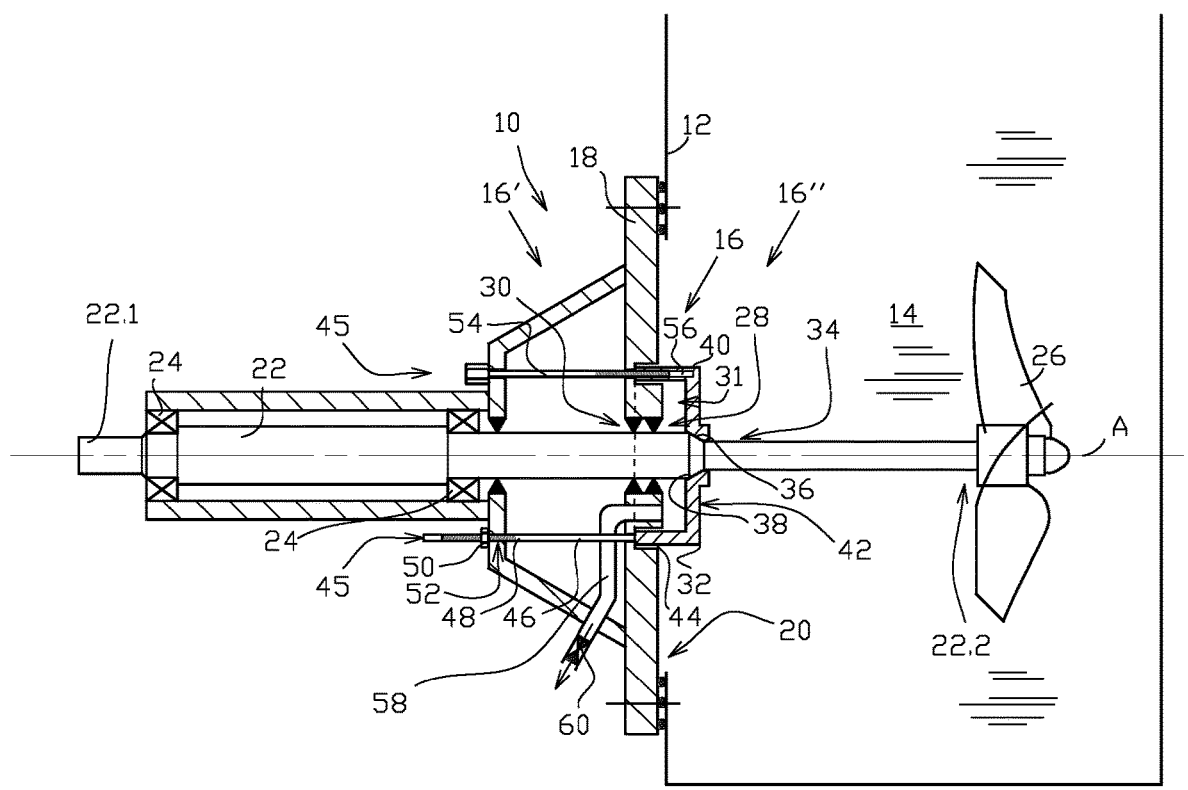
FIG. 2 illustrates an agitator assembly according to another embodiment of the invention.

Referring to the FIGS. 1 and 2 the agitator further comprises a blocking part 32 arranged at the second side 16" of the agitator body i.e. inside the vessel 14 when assembled for use. The blocking part 32 is configured to operate so as to temporarily seal the shaft leadthrough 28 in case the sealing 30 fails and the agitator must be stopped. The blocking part 32 forms a housing around the shaft lead-through 8. The blocking part 32, in its operational axial position, is arranged to form a confined space or room around the lead-through 28, such that full access to the lead-through is provided. By the blocking part 32 in the embodiment according to the FIGS. 1 and 2 the sealing 30 in the lead-through 28 can be serviced or replaced, including auxiliary parts relating to the lead-through, without a need to empty the vessel 14, since it is possible to create a liquid-tight space around the lead-through 28 in the tank 14 by the blocking part 32. Practically it is possible to remove the sealing 30 and parts relating to the sealing simultaneously from lead-through since the surroundings of the lead-through in the side of the tank 14 is free to access. The blocking part 32 is attached to the agitator body 16 in a non-rotatably manner. The blocking part 32 includes a shaft opening 34 through which the shaft 22 is arranged to extend into the tank 14. The shaft opening 34 in the blocking part 32 has a greater diameter than the shaft 22 forming an annular gap between shaft 22 and the blocking part 32, when being in non-operational axial position. The blocking part 32 is movable along the shaft 22 in the axial A direction between its non-operational position, which is shown in FIG. 1 allowing, i.e. not being actively sealed, the liquid flow through its shaft opening 34 and its operational position blocking the liquid flow, which is shown in the FIG. 2. In other words when the blocking part 32 is in its non-operational axial position it is not in contact with the shaft 22, i.e. there is a distinct gap between the shaft 22 and the shaft opening 34 in the blocking part 32.

The blocking part 32, and more particularly the shaft opening 34 therein, and the shaft 22 are provided with mating surfaces 36, 38, which, when brought together by the axial movement of the blocking part 32, provides a temporary seal between the blocking part 32 and the shaft 22. This way the blocking part 32 provides a closed space 31 to the second side 16" of the agitator body 16 around the lead-through 28. In the embodiment of the invention shown in FIGS. 1 and 2 the blocking part 32 comprises a cylindrical, sleeve-like wall section 40 which is arranged to extend parallel with the shaft 22. More particularly, in FIG. 1 the wall section 40 is also arranged coaxially with the shaft 22, which is only an advantageous but not essential feature. It is also possible to arrange the wall section 40 eccentrically to the shaft 22 as long as the shaft opening 34 in the blocking part 32 is coaxial to the shaft. It is also conceivable that instead of being cylindrical, the wall section 40 can be of another form as long as it has walls which surrounds the shaft 22 such that the blocking part 32 provides a closed space 31 around the lead-through 28 of the agitator body (16). In order to house the lead-through 28 to an extent of providing a temporary seal and service access to the leadthrough such that its component may be serviced and/or replaced, the blocking part 32 also comprises an end wall 42 at an axial first end of the blocking part 32, opposite to the agitator body 16 of the agitator assembly 10. The shaft opening 34 is arranged to the end wall of the blocking part 32. The blocking part is therefore a cylindrical cup having the shaft opening 34 at its end wall 42.

The axial movement or movability requires a system which maintains the blocking part 32 in its axial position while it is moved between its non-operation position and its operational position. It is also necessary that the blocking part 32 is sealed to the agitator body 16 at least when the blocking part 32 is in its operational position. These functionalities are provided by coupling of the second end of the wall section 40 of the blocking part 32 to the agitator body 16 of the assembly 10. The agitator body 16 and the blocking part 32 include sealing surfaces which are arranged to coincide with each other in a sealed manner by which the body 16 is sealed with blocking part 32 is in its operational axial position. For that purpose the agitator body in FIGS. 1 and 2 includes a recess 44 on the second side 16" of the agitator body 16, which conforms to shape of an edge of the wall section 40. When the wall section 40 is cylindrical, the recess 44 forms also a circular indent circumscribing the lead-through 28 in the agitator body 16. The second end of the wall section 40 or the blocking part 32 is arranged to extend into the recess 44. The recess 44 and the wall section 40 of the blocking part 32 are dimensioned so that the blocking part can be moved at least axially in the recess. A radial gap between the recess and the wall section 40 can be configured such that the gap also functions as a guide to the blocking part 32.

The agitator assembly 10 also comprises a force transmission means or device 45 configured to move the blocking part 32 and position it to desired axial location. The force transmission device 45 is arranged to be operable in the first side 16' of the agitator body 16 and coupled with the blocking part 32 so as to move the blocking part 32 axially by operating the force transmission device from the first side of the agitator body. As is disclosed in the embodiment of FIGS. 1 and 2 the force transmission device 45 comprises a number of push bars 46 extending through the agitator body 16 parallel with the shaft 22 from the first side 16' to the second side 16".

The push bars 46 include outer threading 48 at least at an opposite to the blocking part 32 for moving the bars axially under control of the threading, by rotating the bar. The bars 46 are preferably evenly spaced circumferentially in the blocking part 32 so as to be able to push the blocking part 32 evenly in axial direction.

The push bars 46 are attached to the agitator body 16 by a threaded opening 52 in the agitator body 16 which is also parallel to the axial direction. An end of the push bar 46 is arranged against the blocking part 32 so that when the push bar is rotated it pushes the blocking part 32 in axial direction away from the agitator body 16 by applying axial pushing force to the blocking part. There can be for example 4 push bars 46 in the assembly 10. The push bars 46 include a locking nut 50 which prevents unintentional rotation of the bars 46 when tightened appropriately.

FIGS. 1 and 2 show that the force transmission device 45 also comprises a number of pull bars 54. The pull bars 54 are also extending through the agitator body 16 parallel with the shaft 22 from the first side 16' to the second side 16".

The pull bars 54 include outer threading 48 at least at an end attached to the blocking part 32. Particularly, the blocking part 32 includes a number of threaded holes 56, a hole for each pull bar 54 so that the pull bars 54 can be screwed into the hole. The pull bars 54 are preferably evenly spaced circumferentially in the blocking part 32 so as to be able to pull the blocking part 32 evenly in axial direction.

The pull bars 54 are arranged to the agitator body 16 through an opening 52 in the agitator body 16 which is also parallel to the axial direction. An end of the pull bar 54 is arranged in threaded connection with the blocking part 32 so that when the pull bar is rotated and its axial movement is prevented it pulls the blocking part 32 in an axial direction towards the agitator body 16 by applying an axial pulling force to the blocking part. There can be for example 4 push bars 46 in the assembly 10.

The push and pull bars 46, 54 are arranged one after the other around the shaft 20 and the axis A, i.e. the bars are alternating so that every other bar is a push bar and every other bar is a pull bar. When the push bars 46 are tightened against the blocking part 32 the pull bars 54 are loosened in order to allow the axial movement of the blocking part away from the agitator body 16, and respectively when the pull bars 54 are tightened, i.e. screwed deeper into the hole 56 the push bars 46 are loosened, i.e. screwed away from the blocking part 32 in order to allow the axial movement of the blocking part towards the agitator body 16.

Now, when the blocking part 32 is moved to its extreme position against the agitator body 16 the mating surfaces 36, 38 in the blocking part and the shaft are simultaneously brought into position of forming a temporary seal between them. In FIG. 2 the operational position of the blocking part 32 is shown and the temporary seal is formed advantageously so that the mating surfaces are brought against each other. The openings through which the bars of the force transmission device are led into the second side of the agitator body 16", i.e. inside the vessel are suitably sealed so that the liquid cannot leak through a gap between the opening and the bar. Even if not specifically shown, the one or both of the mating surfaces can include an optional separate seal member, such as a seal sleeve in the shaft and a seal ring in the blocking member.

As is disclosed in FIGS. 1 and 2, the mating surface comprises advantageously conical surfaces having supplementary angles. The mating surface 36 and the shaft are advantageously formed of a monolithic structure, i.e. the mating surface is formed directly to the material of the shaft. The mating surface comprises a conical surface. The conical surface in the shaft is advantageously converging in the direction away from the agitator body 16 of the assembly 10 and respective the conical surface in the blocking part is converging in the same direction. Axially the location of the mating surface in the shaft is arranged at a distance D from the sealing 30 in the lead-through 28 so that the blocking part 32 forms the space 31 around the lead-though 28 at the side of the tank 14.

According to an embodiment of the invention the assembly comprises a conduit 58, a first end of which opens into an intermediate space housed by the blocking part 32 and the agitator body 16 and which conduit extends from the intermediate space through the agitator body 16 to the first side 16' thereof. The second end of the conduit opens outside the assembly 10 such that it can be accessed for feeding a washing liquid into the space and also for draining the space in controlled manner. The conduit includes a valve 60 which can be used for controlling the flow of the liquid in the vessel through the intermediate space and the conduit 58 out from the vessel 14. The conduit 58 can also be used for flushing the intermediate space, the blocking part 32 and the shaft opening 34 in the blocking part 32.

Figure 3:
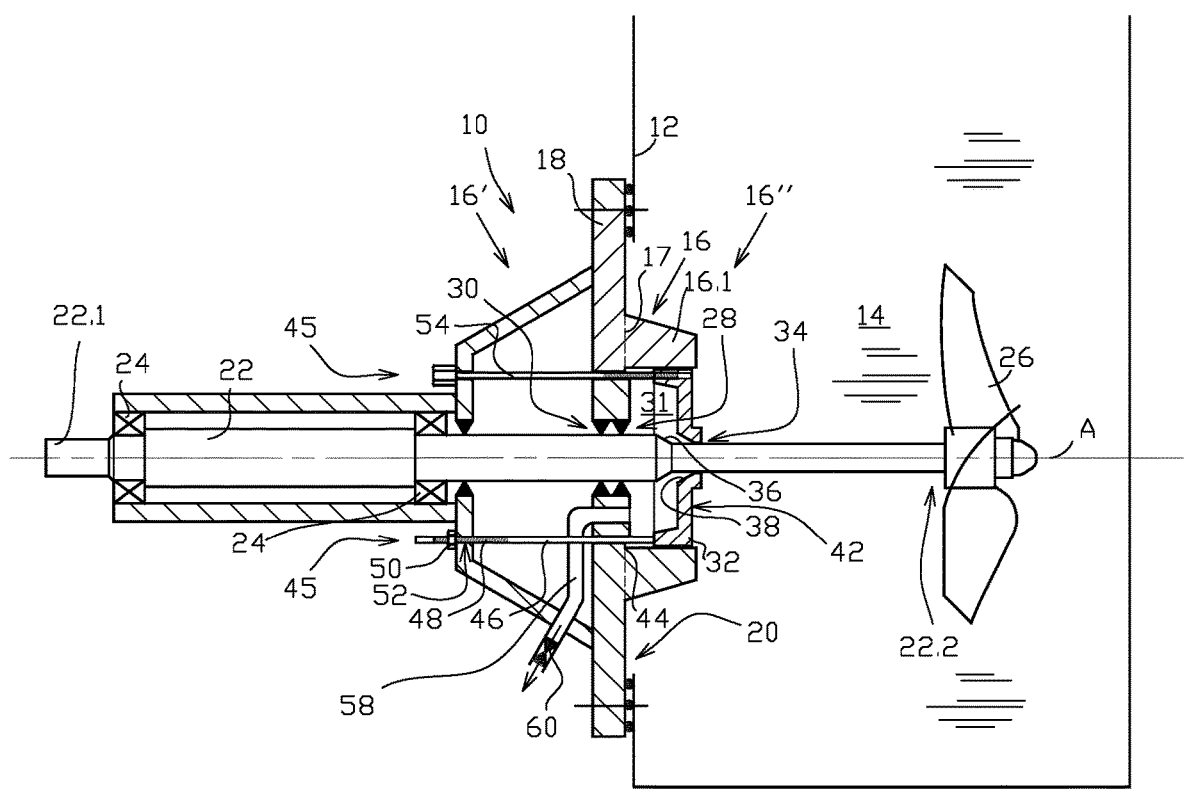
FIG. 3 illustrates an agitator assembly according to still another embodiment of the invention.

FIG. 3 shows an embodiment of the invention where the agitator body 16 comprises an axially extending cylindrical extension 16.1 which form an intermediate space coaxial with the axis A on the second side 16" of the agitator body 16. The blocking part 32 now comprises practically only an end wall 42 including the shaft opening 34. In this embodiment the end wall 42 is sealed radially and also guided by an inner wall of the cylindrical space in the agitator body 16. The axially extending cylindrical extension can also be formed by providing the agitator part with a separate, removably assembled cylinder part as is indicated by the dotted lines 17.

Figure 4:
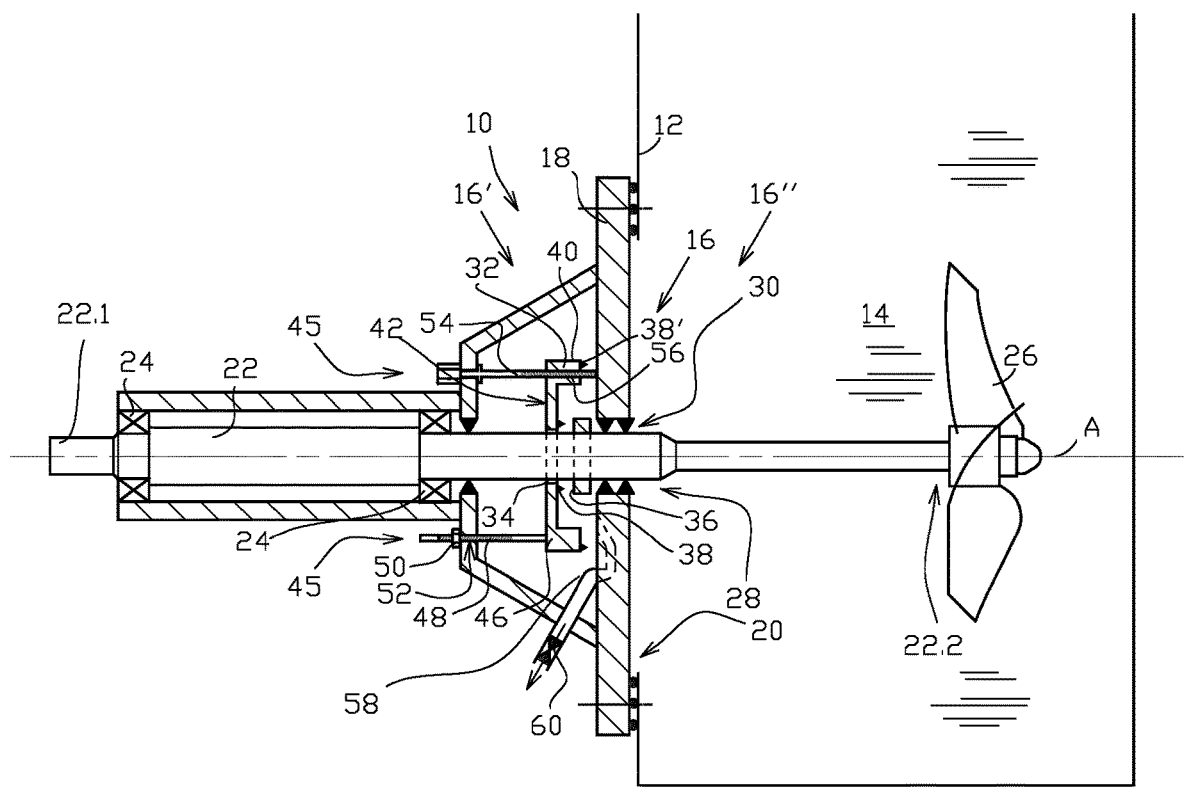
FIG. 4 illustrates an agitator assembly according to still another embodiment of the invention.

FIG. 4 shows a further embodiment of the invention. This embodiment has its main principle similar to those embodiments shown in the other figures, using corresponding reference numbers for corresponding elements. There is also shown an agitator assembly 10, which comprises a blocking part 32. In this embodiment the blocking part 32 is arranged at the first side 16' of the agitator body i.e. outside the vessel 14, on "a dry side", when assembled for use. The blocking part 32 is configured to operate so as to temporarily seal the shaft lead-through 28 in case the sealing 30 fails and the agitator must be stopped. This way the leakage can be stopped until the actual seal 30 is replaced or prepared. In the FIG. 4 the blocking part 32 is attached to the agitator body 16 in a non-rotatably manner. The blocking part 32 includes a shaft opening 34 through which the shaft 22 is arranged to extend. The blocking part 22 is movable along the shaft 22 in the axial A direction between its non-operational position and its operational position at which it is blocking the liquid flow through the shaft opening 34.

The blocking part 32 and the shaft 22 include mating surfaces 36, 38, which, when brought together by the axial movement of the blocking part 32, provides a temporary seal between the blocking part 32 and the shaft 22. This way the blocking part 32 provides a closed space to the first side 16' of the agitator body 16 around the lead-through 28 such that the blocking part is temporarily sealed to the shaft and to the body part 16 around the shaft 22. FIG. 4 also discloses how the mating surfaces include special sealing elements, such a lip seal. There is also a sealing 38' provided to seal the blocking part against the agitator body 16 at the periphery of the blocking part 32 around the shaft 22. The shaft includes a separate sealing part, which is of ring shape. The sealing part is removably assembled around the shaft at suitable axial location so that the sealing 38 in the blocking part pushes against the ring shaped seal part 36 while the periphery of the blocking part is sealed against the agitator body 16.

Even if the above presented manner of axially moving the blocking part is based on the bars by making use of thread based movement is a preferred way due to being very reliable and simple, the manner of providing the axial movement of the blocking part may be accomplished by other means as well. Particularly the actuation of the bar in the axial direction can be accomplished by providing the bars by a suitable link mechanism instead of rotating the bar. The bars can also include an electric, pneumatic or hydraulic power device.

Figure 5:
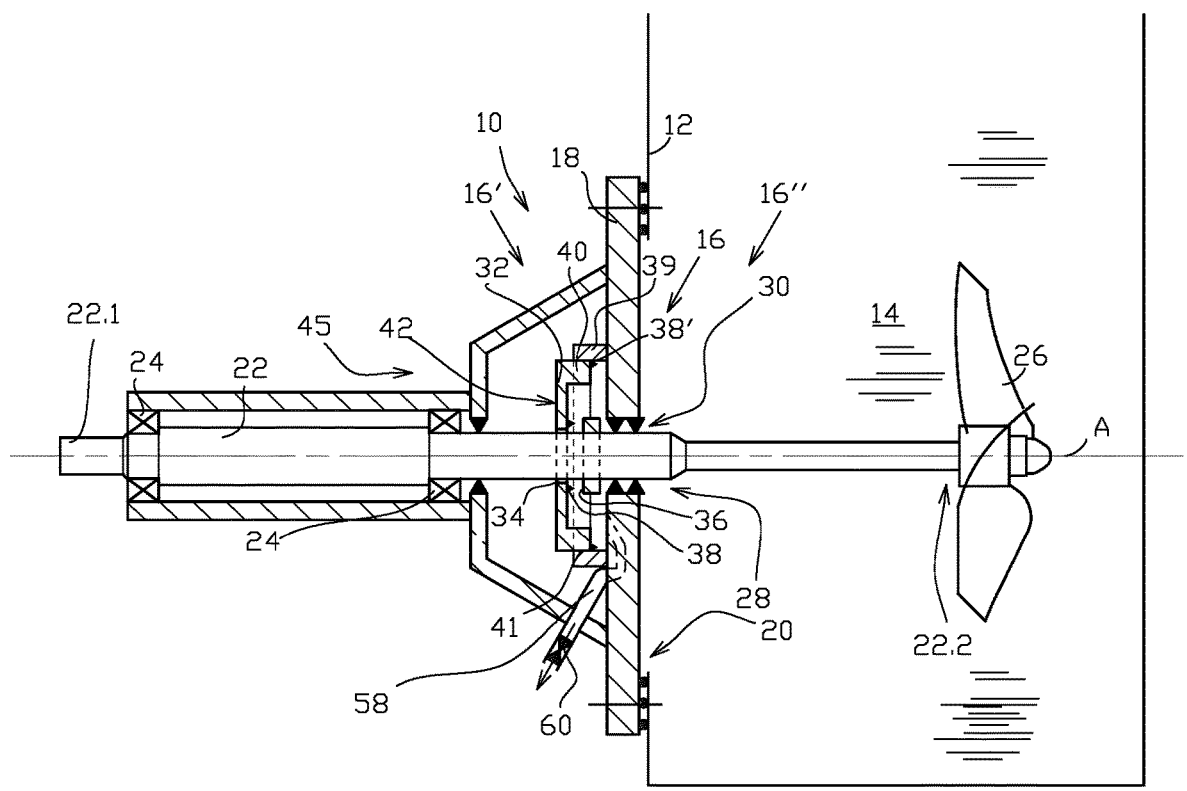
FIG. 5 illustrates an agitator assembly according to still another embodiment of the invention.

FIG. 5 shows another embodiment intended to express that even if in FIGS. 1 to 4 the manner of moving the blocking part axially is based on the push/pull bars parallel with the axis A as a force transmission device, the blocking part 32 can be moved axially in another manner. In FIG. 5 the blocking part 32 is supported to the agitator body part 16 by a cylindrical sleeve part 39 attached to the body part 16 coaxially with the shaft 22. The sleeve part 39 includes inner threading while the blocking part includes a respective threading at its radial outer wall. This way, the blocking part is coupled movably to the sleeve part by the mating threadings. The axial position of the blocking part can be changed by rotating the blocking part in respect to the sleeve part 39. So, the blocking part can be brought to its operational position blocking the liquid flow by rotating it around the axis A into a suitable direction.

Figure 6:
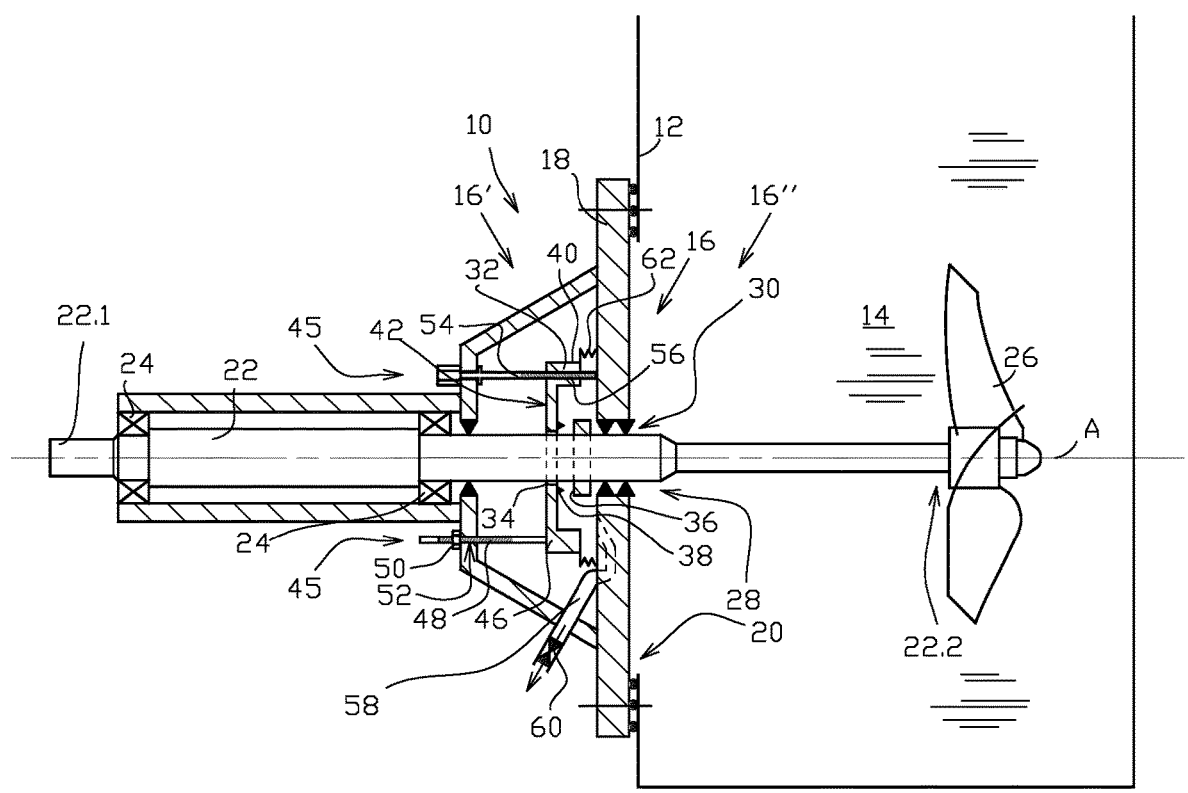
FIG. 6 illustrates an agitator assembly according to still another embodiment of the invention.

FIG. 6 shown an embodiment which is a modification of the embodiment shown in FIG. 4, in which the blocking part 32 is permanently attached at its radial periphery to the body part 16 by a bellows or other axially flexible liquid tight structure 62 around the shaft 22.

While the invention has been described herein by way of examples in connection with what are, at present, considered to be the most preferred embodiments, it is to be understood that the invention is not limited to the disclosed embodiments, but is intended to cover various combinations or modifications of its features, and several other applications included within the scope of the invention, as defined in the appended claims. The details mentioned in connection with any embodiments above may be used in connection with another embodiment when such combination is technically feasible and provides the technical effect of the invention.

What is claimed is:

1. An agitator assembly comprising:
   an agitator body configured to be attached to a wall of a vessel or a tank; and
   a shaft having an axial direction, the shaft being rotatably assembled to the agitator body and extending through a lead-through in the agitator body into the vessel or the tank, when assembled for use, and further including a sealing configured to seal the rotatable shaft, and
   an axially movable blocking part arranged at the agitator body and including a shaft opening through which the shaft is arranged to extend, a mating surface configured to mate with the shaft which, when brought together by axial movement of the blocking part, provides a seal between the blocking part and the shaft, and the mating surface arranged at an axial distance from the sealing in the lead-through, and with the agitator body which, when brought together by the axial movement of the blocking part, provides a seal between the blocking part and the shaft and between the blocking part and the agitator body, and that the blocking part provides a closed space around the lead-through in the agitator body.

2. The agitator assembly according to claim 1, further comprising a force transmission device configured to axially move the blocking part.

3. The agitator assembly according to claim 2, wherein the force transmission device is arranged operable in a first side of the agitator body and coupled with the blocking part so as to move the blocking part axially by operating the force transmission device from the first side of the agitator body.

4. The agitator assembly according to claim 3, wherein the force transmission devices comprises a number of pull bars and a number of push bars extending through the agitator body parallel with the shaft from the first side to a second side, the bars being configured to move the blocking part in the axial direction.

5. The agitator assembly according to claim 4, wherein the pushing and pull bars are arranged one after another around the shaft so that every other bar is one of the push bars and every other bar is one of the pull bars.

6. The agitator assembly according to claim 5, wherein the mating surfaces in the blocking part and the shaft comprise conical surfaces having supplementary angles.

7. The agitator assembly according to claim 1, wherein the shaft is arranged to extend through the lead-through from a first side to a second side of the lead-through, the second side being inside the vessel when assembled for use, and the blocking part being arranged at the second side of the agitator body such that the blocking part provides the closed space at the second side of the agitator body around the lead-through, the closed space being liquid-tight.

8. The agitator assembly according to claim 1, wherein the shaft is arranged to extend through the lead-through from a first side to a second side of the lead-through, the first side being outside the vessel when assembled for use, and the blocking part being arranged to the first side of the agitator body such that the blocking part provides the closed space at the second side of the agitator body around the lead-through.

9. The agitator assembly according to claim 1, a mating surface of the shaft is formed directly from material of the shaft.

10. The agitator assembly according to claim 1, wherein the blocking part comprises a cylindrical section parallel with the shaft and an end wall at end opposite to the agitator body, the shaft opening arranged in the end wall, and the agitator body including a circular, axially extending recess, into which the blocking part is arranged in a movable manner.

11. The agitator assembly according to claim 1, further comprising a conduit, a first end of which opens into the closed space formed by the blocking part.

\* \* \* \* \*